United States Patent [19]
Hisada et al.

[11] Patent Number: 5,672,947
[45] Date of Patent: Sep. 30, 1997

[54] AUTOMATIC GUIDE METHOD FOR VEHICLES

[75] Inventors: Yukio Hisada; Hiromi Otake; Tadashi Ike; Motohiro Sugiyama, all of Shizuoka, Japan

[73] Assignee: Yazaki Industrial Chemical Co., Ltd., Japan

[21] Appl. No.: 529,094

[22] Filed: Sep. 15, 1995

[51] Int. Cl.$^6$ .................................................. B64C 13/18
[52] U.S. Cl. ........................... 318/587; 318/580; 364/443
[58] Field of Search ..................................... 318/587, 580; 364/443, 447, 424.01

[56] References Cited

U.S. PATENT DOCUMENTS

| | | |
|---|---|---|
| 4,846,297 | 7/1989 | Field et al. .......................... 318/587 X |
| 4,847,773 | 7/1989 | Van Helsdingen et al. ............. 364/443 |
| 5,525,884 | 6/1996 | Sugiura et al. . | |

FOREIGN PATENT DOCUMENTS

3013716  5/1995  Japan .

*Primary Examiner*—Karen Masih
*Attorney, Agent, or Firm*—Ronald P. Kananen

[57] ABSTRACT

The automatic guide method for vehicles relates to an automatic guide method for the operation of unmanned vehicles which, guided along guide paths preset on the floor in factories and warehouses, etc., carry and handle various loads in a fully automated fashion, and more particularly to an automatic guide method which has a course-search function and function to prevent straying such that a vehicle which is positioned at the start of an operation with its magnetic sensor off the guide path within certain limits or which strays off course abruptly for some reason during ordinary operation, is restored to the guide path by searching and finding the magnetic tape.

9 Claims, 8 Drawing Sheets

AUTOMATIC GUIDE METHOD FOR VEHICLES

BACKGROUND OF THE INVENTION

The present invention relates to an automatic guide method for the operation of unmanned vehicles which, guided along guide paths preset on the floor in factories and warehouses, etc., carry and handle various loads in a fully automated fashion, and more particularly to an automatic guide method which has a course-search function and a straying-prevention function such that a vehicle which is initially positioned with its magnetic sensor off the guide path within certain limits, or which strays off course abruptly for some reason during ordinary operation, is restored to the guide path by searching and finding the magnetic tape.

The purpose of the invention is to provide an automatic guide method in which a vehicle which is positioned with its sensor out of the effective range of the magnetic field of the guide tape can be started up for ordinary operation and repositioned as long as the vehicle's sensor is sufficiently close to the guide tape to be able detect such guide tape, through an automatic search during a preset period of time (the course-search function) and in which a vehicle which suddenly strays off course during normal operation can be restored to the path through an automatic search of the guide path (the straying-prevention function), thereby improving the efficiency of such guided vehicles.

The second object of the invention is to provide a guide method in which, when a vehicle does not recognize the guide path within the preset time during the course-search operation after the start button is pressed (starting operation) or when a vehicle does not return to the path within the preset time during the straying-prevention function after straying off course for some reason, the operation of the vehicle is halted in order to prevent unexpected accidents.

Various kinds of automatically guided vehicles (often called AGVs for short) have been developed and put into practice.

Japanese Patent No. 3013716, for example, discloses an unmanned magnetically guided vehicle that automatically runs along a closed loop formed with a magnetic tape.

The unmanned magnetically guided vehicle mentioned above shows a high level of technical development and practicality. However, since the vehicle uses a system wherein a magnetic sensor detects the magnetism (magnetic field) produced by the magnetic tape to guide the vehicle, if the vehicle is in an initial position where its magnetic sensor is outside the effective range of the magnetic field generated by the tape, the vehicle cannot be started. In such a case, the person in charge must look under the vehicle and manually adjust the position of the vehicle in order to align the sensor and the tape, which results in a rather long delay prior to starting.

Moreover, when the vehicle strays off course due to an obstacle on the guide path or due to an unexpected outside force, the vehicle must be manually restored to the guide path and the restart button must be manipulated for resumption of operation, requiring time for resumption of operation. Such manual operations lower the efficiency of such vehicles.

OUTLINE OF THE INVENTION

The automatic guide method according to the present invention is operated as follows with a magnetically guided vehicle which is equipped with a driving wheel, a sensor for detecting a magnetic field generated by a magnetic tape placed along a guide path on the floor, a driving means which is automatically controlled by a control device that processes signals detected by the sensor and a steering device:

(a) At the start of operation, as a first step, the sensor is controlled to turn to the left and right to find the position of the guide path;

(b) If the guide path cannot be detected by the operation of (a), as a second step, the vehicle is moved at low speed with the steering device turned in one direction for a preset period of time in order to search for the guide path, and if unsuccessful in finding the guide path, the steering device is turned in the opposite direction and the vehicle is moved at low speed for twice the above preset period of time in order to find the guide path;

(c) If the guide path is detected in the above steps (a) or (b), the vehicle is accelerated to normal high-speed along the guide path;

(d) If, however, the guide path cannot be found in the above steps (a) or (b), the vehicle is halted. The above steps are the relevant steps for the automatic guide method based on the course-search function.

The next guide method according to the present invention is operated as follows with a magnetically guided vehicle which is equipped with a driving wheel, a sensor for detecting a magnetic field generated by a magnetic tape placed along a guide path on the floor, a driving means which is automatically controlled by a control device that processes signals detected by the sensor and a steering device:

(a) If a vehicle strays off the course of the magnetic tape, the speed of the vehicle is first reduced, the direction of deviation is detected, the steering means is turned to the direction opposite to such deviation, and by searching for and finding the guide path within the preset time, the vehicle is restored to the path and accelerated to normal operational speed;

(b) If the vehicle cannot be restored to the path within the preset time, the operation of the vehicle is halted. The above steps are the relevant steps for the automatic guide method based on the straying-prevention function.

In the case of a vehicle which is comprised of a magnetically guided steering-driving unit which includes a driving wheel, a magnetic sensor that detects the magnetism from the guide path made of magnetic tape and is mounted so as to be steered in unison with the driving wheel, a driving means and a steering means for the driving wheel automatically controlled by a control device that processes signals detected by the sensor, and a trolley which has four wheels at each of its corners, underneath which trolley the driving/steering unit is mounted, according to present automatic guide method, the vehicle is controlled at the start of operation first to turn the sensor right and left with the driving wheel using the steering means in order to search for the guide path while the vehicle is halted.

On the other hand, when the vehicle is comprised of a pair of driving wheels on either side of the middle of the underside of the chassis, a sensor that detects the magnetism from the guide path made of magnetic tape at the front of the trolley, a driving means for each of the driving wheels automatically controlled by a control device that processes the signal from the sensor, and a steering means that differentially drives the driving wheels using such driving means controlled automatically by the control device, according to the present automatic guide method, the vehicle is controlled at the start of operation in such away as to turn the sensor right and left in order to search for the guide path through the differential motion of the pair of driving wheels using the steering means.

Figure 1:
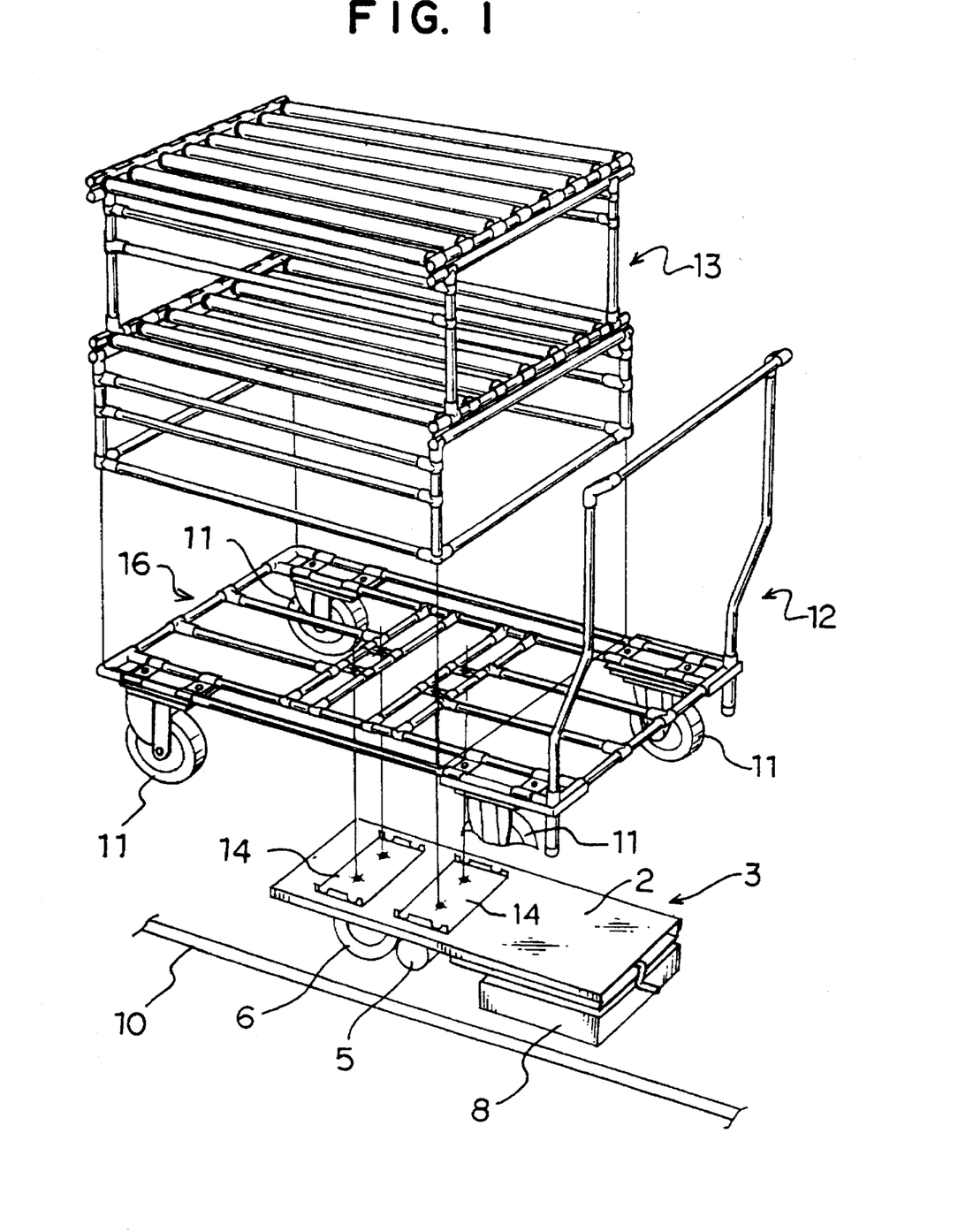
FIG. 1 is an exploded perspective view showing the construction of a magnetically guided vehicle.
Figure 2:
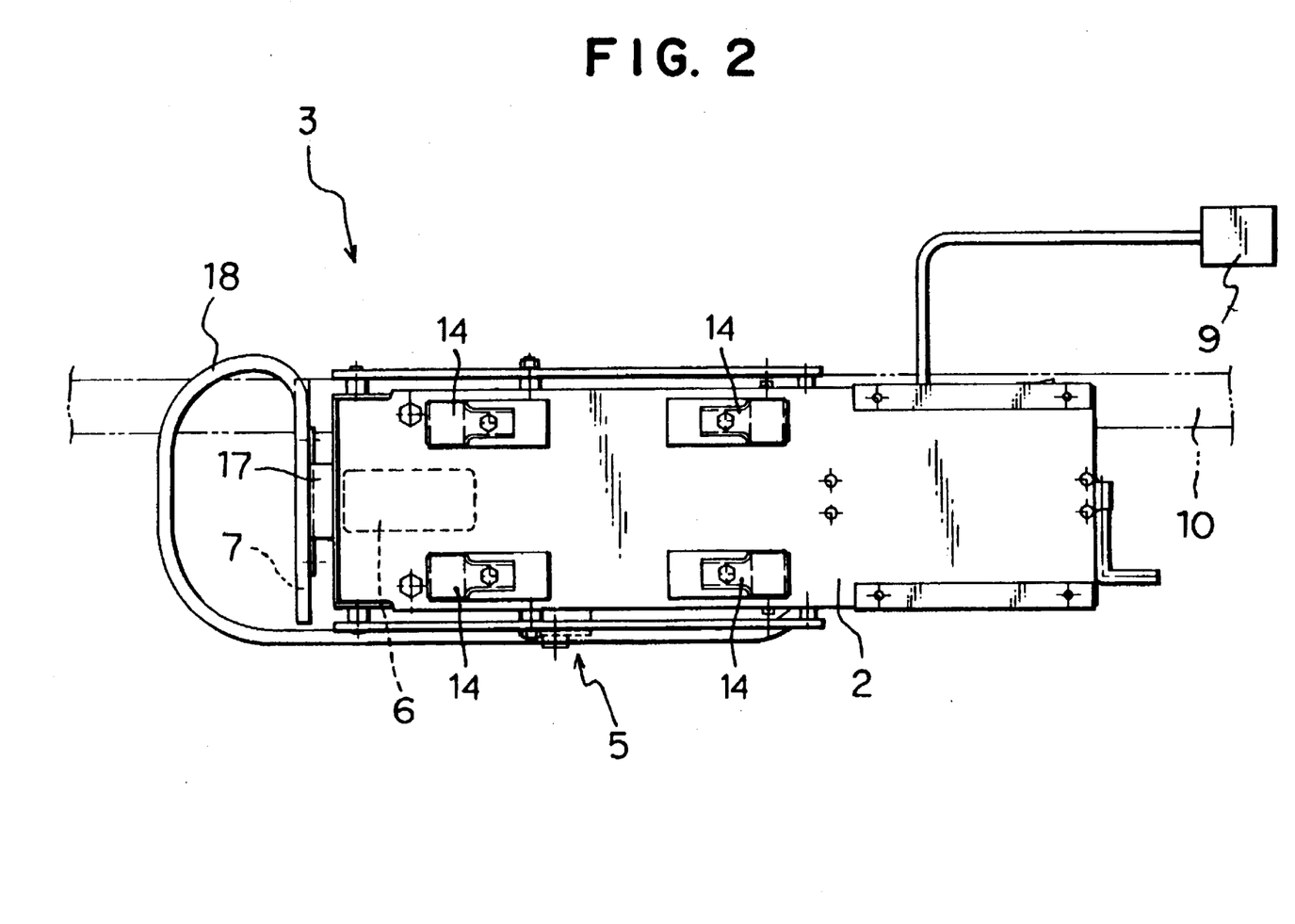
FIG. 2 is a plan view of a driving/steering unit.
Figure 3:
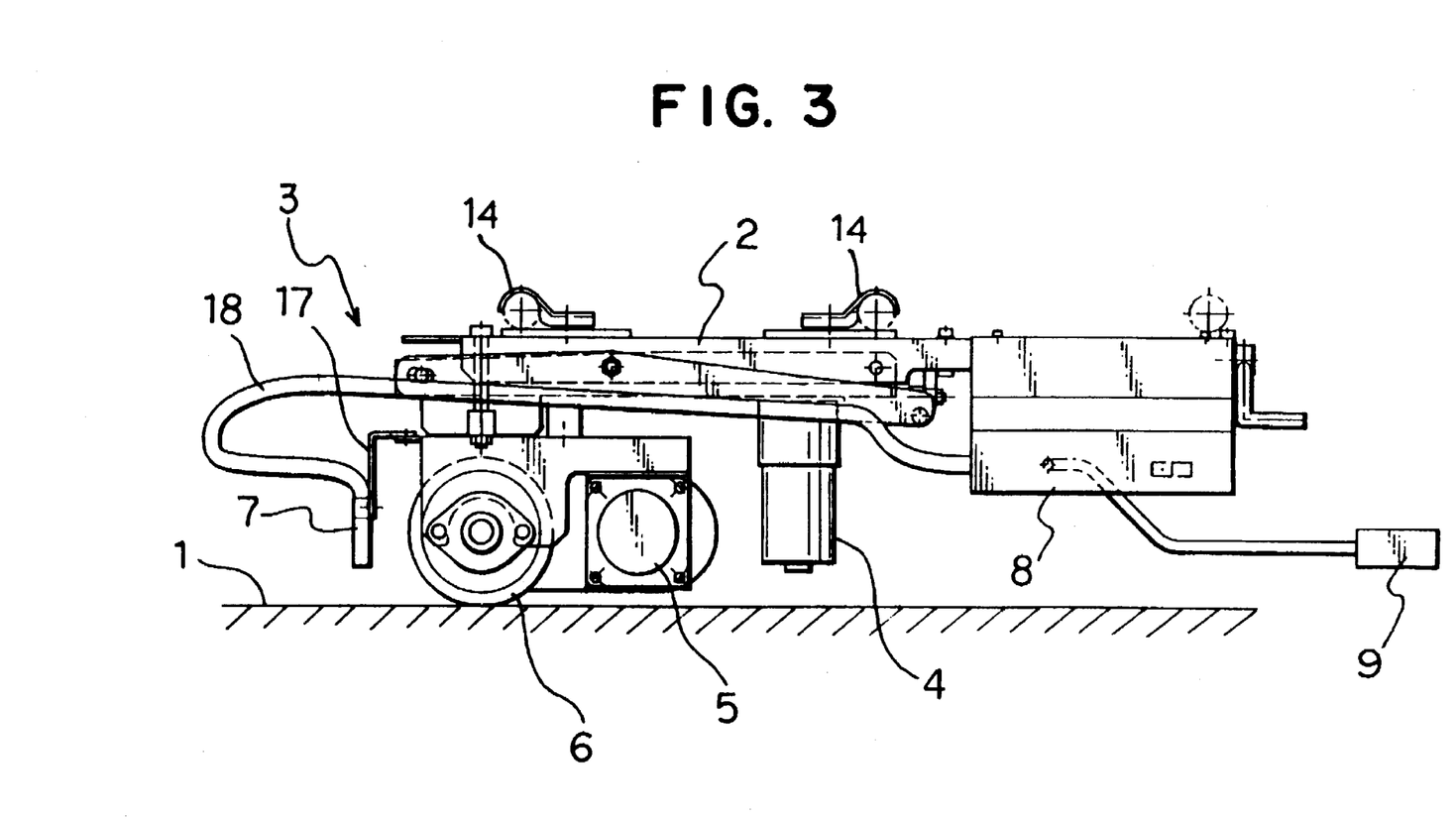
FIG. 3 is a side-elevational view of a driving/steering unit.

The vehicle with a single driving wheel shown in FIG. 1–3 can be constructed with a single driving and steering means and the control can also be simplified. To assure running stability, however, the front wheels of the trolley should be universal casters and the rear wheels should be fixed casters, which makes automatic control (steering) for the backward movement of the vehicle very difficult. On the other hand, the vehicle with two driving wheels shown in FIGS. 9 and 10 requires a driving and steering means for each driving wheel and the control system which controls the synchronous driving and turning motion using differential driving is more complex, though all the wheels of the trolley can be universal casters. This makes automatic control (steering) for both forward and backward motion easy and it should be understood that this type of vehicle is quite suitable for movement along either a straight or curved path.

In the present invention, the maximum preset time for undertaking the course-search function or the straying-prevention function can be set to an arbitrary value.

The software in the control box (control device) is programmed so that, as the operation of the guided vehicle is started by, for example, pressing a start button, the vehicle will perform the unmanned operation until a stop button is pressed.

As the start button is pressed, the steering means turns the sensor right and left as a first step. If the sensor comes onto the guide path area through this process, the sensor emits a detection signal at which point the vehicle immediately begins normal operation. Otherwise, the control performs the second step in which the steering means is fully turned to the left (or right) and the driving moves the vehicle through a low-speed turning motion to search for the position of the guide path for a preset time. If the guide path cannot be found by this operation, the steering means is fully turned to the opposite direction (to the right) and the vehicle is moved similarly through a low-speed turning motion to search for the position of the guide path for a preset time. On detection of the guide path, the vehicle is accelerated along the guide path to normal high-speed operation. In the event the guide path is not found during the preset time, the operation of the vehicle is immediately halted, (the course-search function).

Next, when the vehicle strays off course abruptly during normal operation, the direction of deviation is determined immediately through calculation by the control device based on data showing the change in relative position of the guide path with respect to the sensor at the point of deviation. Then, the vehicle turns the steering means in the direction opposite to the deviation direction and shifts to low-speed in order to search for the guide path. Since the vehicle is surely back on the guide path the moment the sensor detects the guide path, the vehicle is accelerated along the guide path to normal high-speed operation. However, if the guide path cannot be detected within the preset time, the operation of the vehicle is immediately halted, (the straying-prevention function).

The automatic guide method of the present invention can be similarly adopted by the following types of guided vehicles:

1) An electro-magnetically guided vehicle which is guided through detection by a sensor of a magnetic field formed about a guide wire placed on or under the floor and through which electric current flows.

2) An optically guided vehicle which is guided by optically detecting a guide tape laid on the floor with an optical sensor.

3) A magnetically guided vehicle which is guided by detecting magnetic material placed on or under the floor with a magnetic sensor.

According to the automatic guide method of the present invention for guided vehicles, a vehicle that is initially positioned with its sensor off the guide path can be started through automatic detection of the guide path, which means that only a rough positioning of the vehicle relative to the guide path is needed, resulting in shorter preparation time for starting and greater efficiency.

Moreover, in the event of an unexpected deviation of a vehicle from the guide path, the vehicle is automatically restored to the guide path without halting the operation, also resulting in a reduction of time loss and enhanced operation.

EMBODIMENTS

The embodiments of the present invention are described below with reference to the attached drawings.

The general construction of the automatically guided vehicle (AGV) shown in FIGS. 1–3 is relatively similar in terms of hardware to that of the vehicle disclosed in Japanese Patent No. 303716 and will be described briefly.

Figure 4:
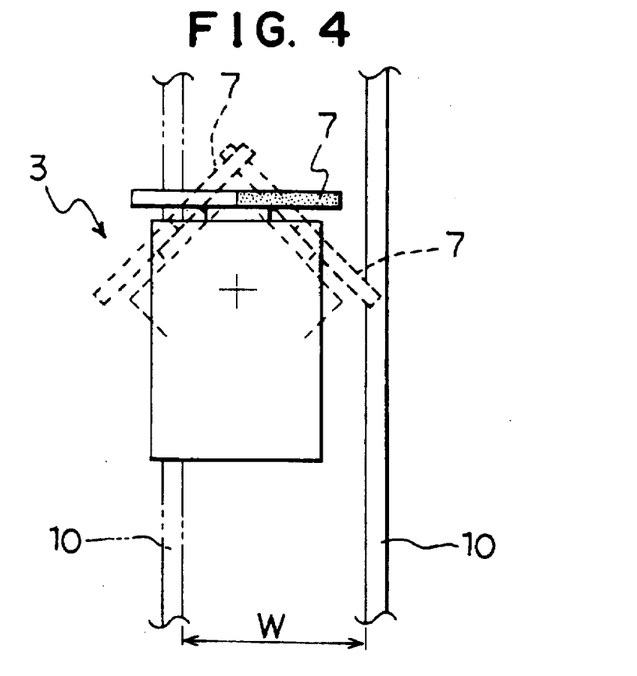
FIG. 4 is an illustration showing, in a plan view, the range of search for the magnetic tape scanned by the right and left turning of a sensor.

This AGV comprises a magnetic guide-type driving/steering unit 3 which has a driving means 5 for a driving wheel 6 and a steering means 4 for the driving wheel 6, and a trolley 12 having a chassis 16 which has wheels at its four corners. The driving means is controlled by a control device 8 that processes signals from a sensor 7 that detects the magnetism generated by a guide path formed with magnetic tape 10. The driving/steering unit 3 is attached underneath the chassis. The magnetic sensor 7 is, as shown in FIG. 3, attached to the front portion of a holder of the driving wheel 6 with a bracket 17 so that the sensor 7 turns in unison with the driving wheel 6. The magnetic sensor 7 is positioned on the right half of a horizontal bar (FIG. 4). The magnetic sensor 7 and the control device (control box) 8 are connected with a cable 18.

A shelf 13 is mounted, if necessary, on the chassis 16 of the trolley 12 for carrying loads. An attachment plate 2 for the driving/steering unit 3 is positioned under the chassis 16 and fixed by fastening bolts to attachment seats 14. The front wheels of the trolley 12 are universal casters and the rear wheel are fixed casters. The control device (control box) 8, which processes signals from the magnetic sensor 7, controls a motor 5 that is the driving power source for the driving means for the driving wheel 6 and a steering motor 4 that is the power source for the steering means for the driving wheel 6. The chassis 16 and the shelf 13 are constructed from resin-coated steel pipes coupled together with joints.

Figure 8:
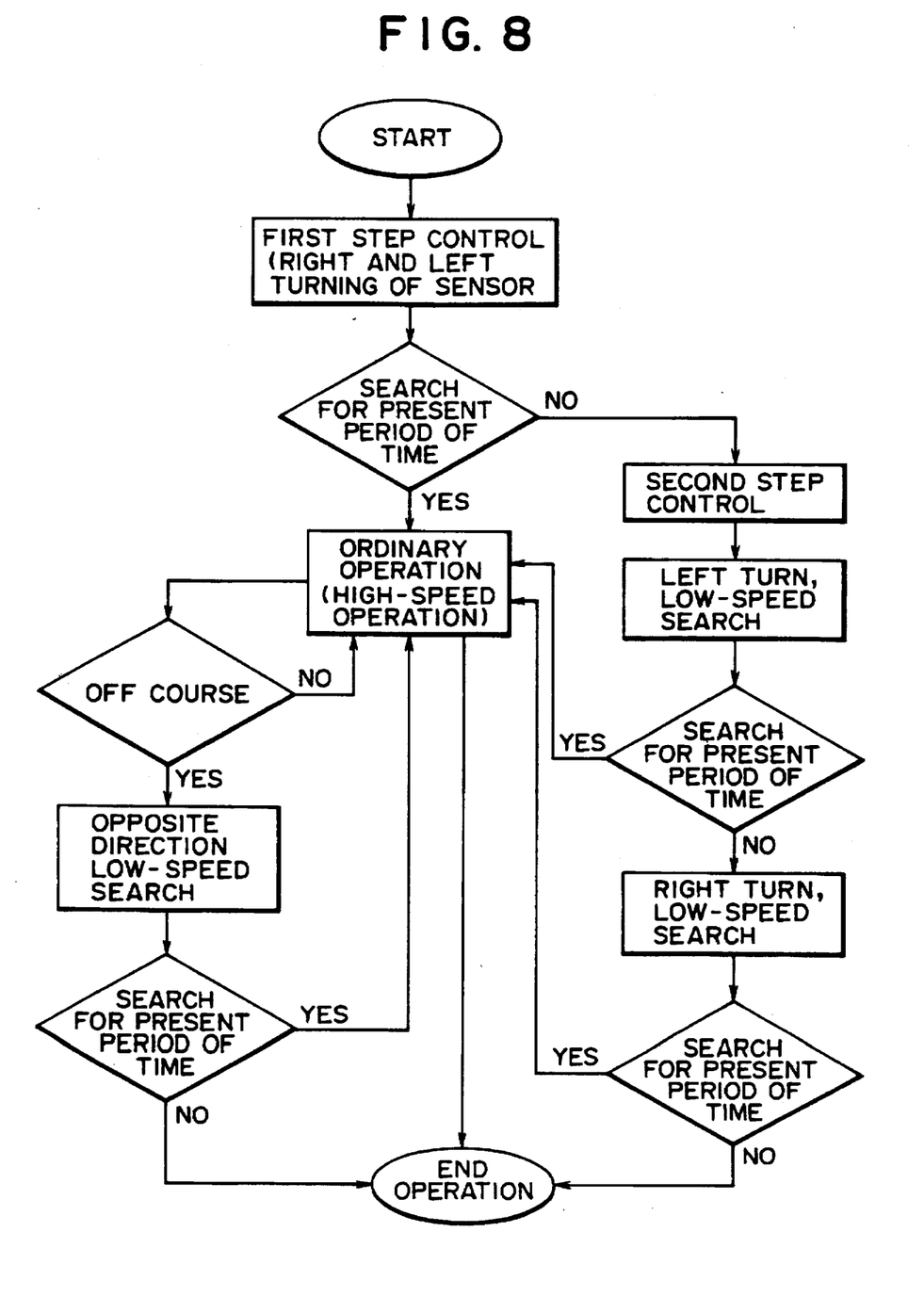
FIG. 8 is a flow chart illustrating the process of the automatic guide method.

A connector 9 is provided to connect the steering motor 4 and driving motor 5 with a power source battery (not shown) mounted on the chassis 16. The control box 8 that administers the automatic control process of the driving/steering unit 3 is attached underneath the attachment plate 2, at the rear. The process flow of the software for the automatic guide method installed in the automatic control device in the control box 8 is as shown in FIG. 8.

FIG. 4 shows the area W in which the steering means 4 of the driving/steering unit 3 is able to detect the magnetic field generated by the magnetic tape 10 by turning the magnetic sensor 7 together with the driving wheel 6 right and left while the vehicle itself is stopped as a first step in the course-search function after the start button is pressed to start operation of the vehicle. The magnetic sensor 7 is provided to the right of the driving wheel 6 which is arranged at the middle of the width of the driving/steering unit 3, or more precisely, within 75 mm from the right end (roughly the right half), in order to minimize the possibility of the driving wheel 6 rolling on the magnetic tape 10. The width of the range W in which the magnetic sensor 7 is able to detect the magnetic field of the tape 10 by turning right and left is about 210 mm.

Figure 5:
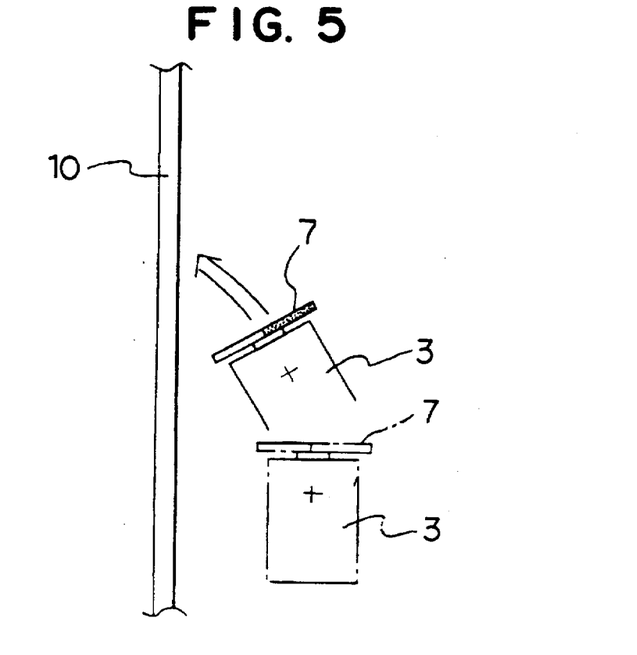
FIG. 5 is an illustration showing, in a plan view, a search for the position of the magnetic tape while running at low speed.

FIG. 5 shows the vehicle (driving/steering unit 3) and the magnetic sensor 7 which, having moved off the magnetic tape 10 to the right, as an example, is unable to locate the tape 10 by turning the magnetic sensor 7 right and left, (the first step control) and is now in the second step control. In the second step control under the above conditions, the driving/steering unit 3 fully turns the driving wheel 6 to the left and, starting at a low speed of about 4 m per minute, searches for the position of the magnetic tape 10 for a preset time (20 seconds in this embodiment). In this case it is obvious that the tape 10 will be found very soon.

Figure 6:
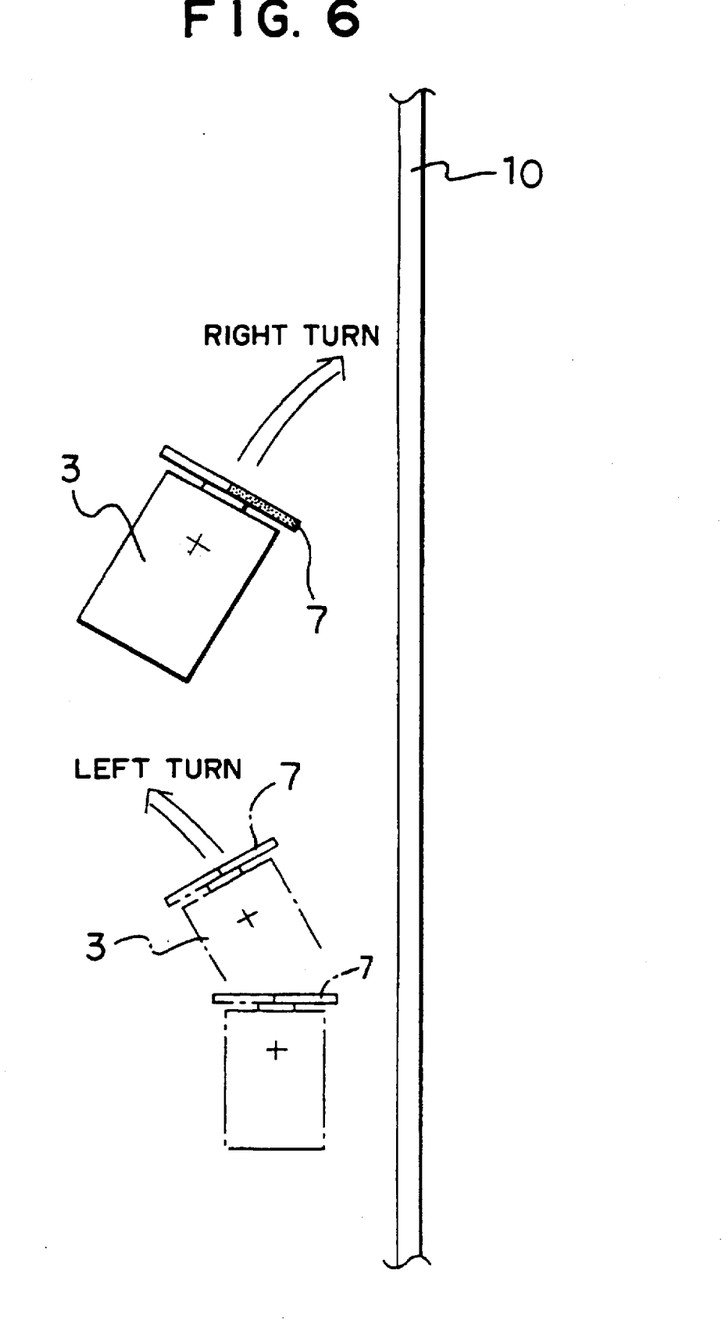
FIG. 6 is an illustration showing, in a plan view, a search for the position of the magnetic tape while running at low speed.

FIG. 6 shows the case in which the magnetic sensor 7 and the vehicle (driving/steering unit 3) are in the second step control to the left of the magnetic tape 10. Through the motion (shown by the broken lines) made with the driving wheel fully turned to the left as shown in FIG. 5, the magnetic tape 10 can obviously not be detected during the preset time for searching. The second step control thus fully turns the driving wheel 6 and lets the vehicle search for the magnetic tape 10 (shown by the solid lines) running at low speed for twice as long as the previous try (40 seconds in this example). It will be seen that the probability of the vehicle and the magnetic sensor 7 reaching the magnetic tape 10 and emitting the detection signal is fairly high.

As described above, in the first step control just after the start button is pressed to start the operation of the AGV which may be initially positioned anywhere, the guide path is searched only through the right and left movement of the magnetic sensor 7 without moving the vehicle itself. If the guide path is not found with this step, the control advances to the second step and a search is made first with a leftward turning motion at a low speed and then if the guide path still is not found, with a low-speed rightward turning motion, hence establishing a fairly wide search area and a high probability of success in finding the guide path. If, notwithstanding all the measures described above, the magnetic sensor 7 cannot find the guide path (the magnetic tape), the situation is determined to be an extraordinary case, the operation of the vehicle is terminated, and the rest is left to manual operation by the person in charge. The last is a measure to prevent unexpected accidents. If, on the other hand, the magnetic tape 10 is successfully found with the first or the second step control, the vehicle is accelerated to the normal high speed operation of 24 m per minute along the guide path of the magnetic tape 10.

Figure 7:
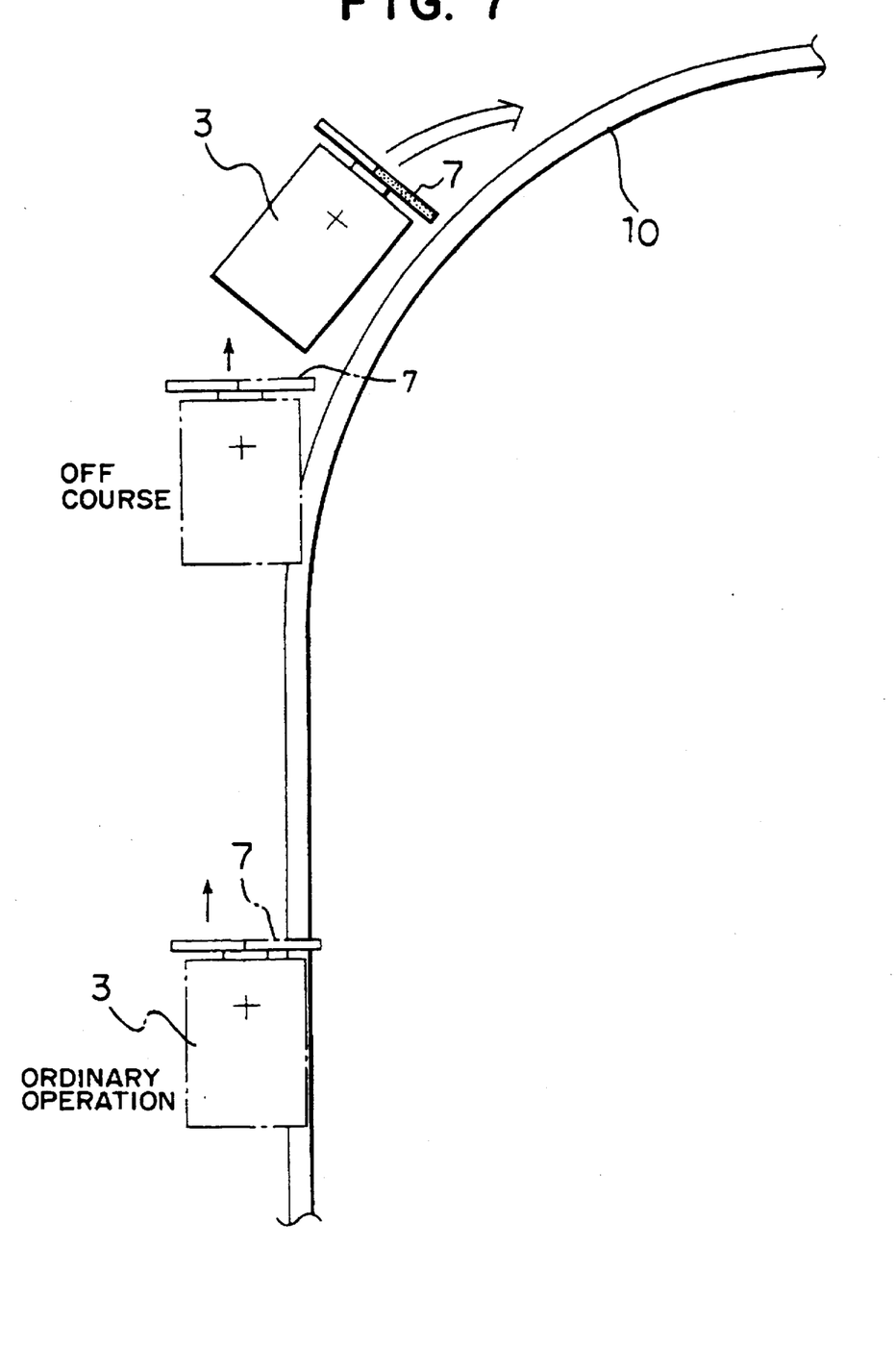
FIG. 7 is an illustration showing, in a plan view, the restoration of the vehicle to the guide path, after deviation, by searching for the magnetic tape.

Next, FIG. 7 shows the control action (straying-prevention function) of the automatic guide method of the present invention when the AGV has strayed off course by running over an obstacle on the course or due to an unexpected outside force exerted against the vehicle. In such case, the control device processes the records of the action of the sensor 7 at the moment of the deviation, immediately determining the direction of the deviation, turns the driving wheel 6 in the direction opposite to the deviation, and searches for the magnetic tape 10 at low speed for a preset time (8 seconds in this example). This provides a high probability of success in finding the magnetic tape 10 and, since the detection of the tape means the return of the vehicle to the guide path, the control device can then accelerate the vehicle in order to resume its normal high-speed operation. In this case as well, however, if the magnetic tape is not found during the preset time, the operation is immediately halted to prevent an unexpected accident and the rest is left to manual operation by the person in charge.

Figure 9:
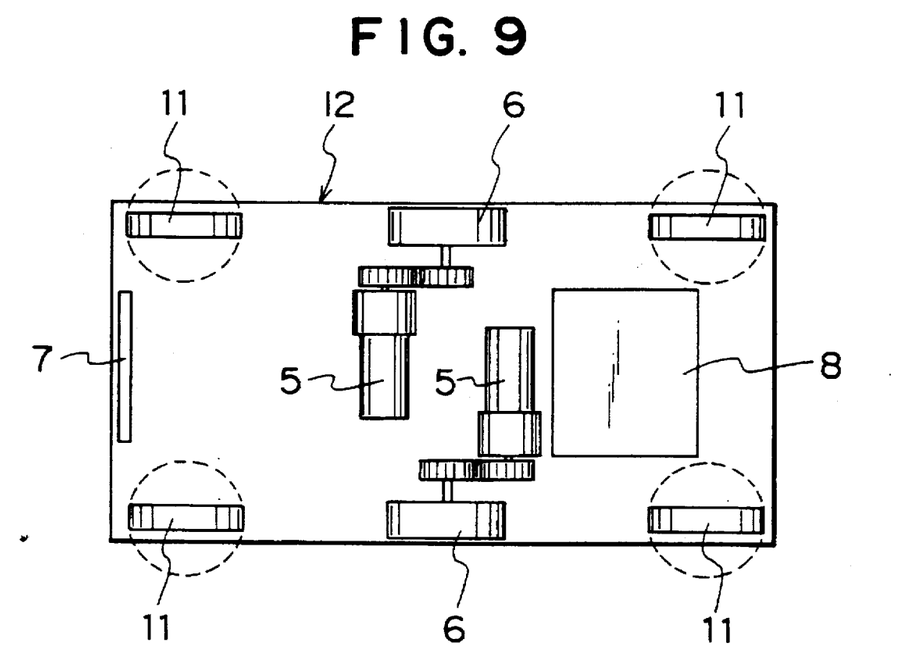
FIG. 9 is a bottom view of an example of a vehicle having two driving wheels and four universal casters.
Figure 10:
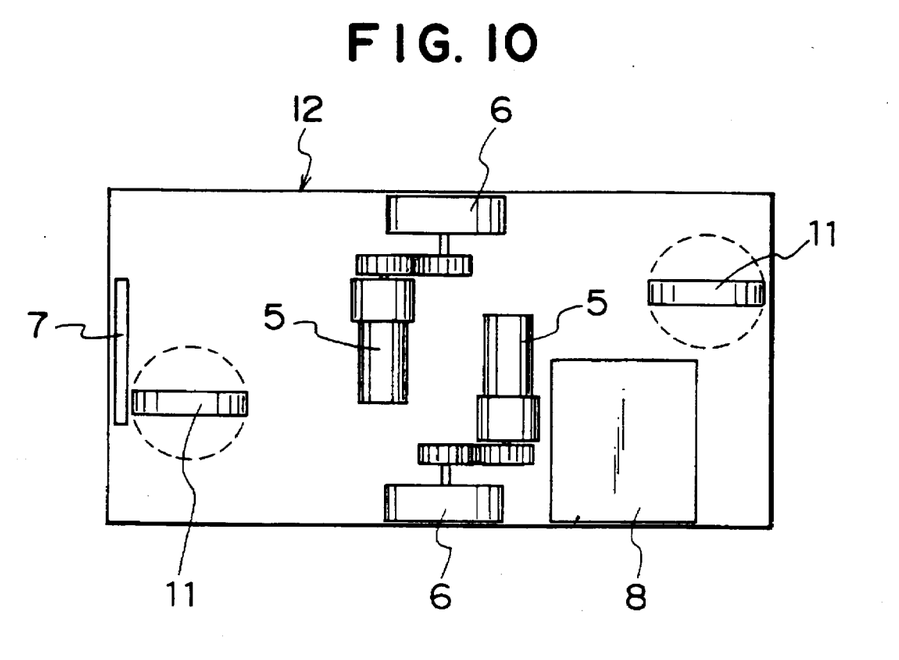
FIG. 10 is a bottom view of an example of a vehicle having two driving wheels and two universal casters.

Next, the vehicle shown in FIG. 9 is constructed such that a chassis 12 has universal casters 11 at each of its four corners, two driving wheels 6,6 provided on both sides at the middle of the underside of the chassis, and for each of the driving wheels 6,6 a driving motor 5 which is automatically controlled by a control device 8 that processes signals detected by a sensor 7. The vehicle shown in FIG. 10 is different from that in FIG. 9 only in that two universal casters 11,11, one at the front and the other at the rear portion of the underside of the chassis, are provided. When the pair of driving wheels 6,6 are synchronously controlled, the vehicle moves straight (forward and backward) and when the pair are controlled for differential motion, the vehicle makes a turning motion (also moving forward and backward). In either event, the automatic guide method described above can be incorporated in exactly the same manner for either vehicle shown in FIGS. 9 and 10.

According to the automatic guide method of the invention, even if the magnetic sensor is not on the guide path (magnetic tape) at the start of the operation, the vehicle can find the magnetic tape (guide path) automatically with a high degree of probability and can start operating. On the other hand however, if the vehicle strays off the course unexpectedly, the vehicle can return to the guide path with a high degree of probability by automatically finding the magnetic tape (guide path). The above allows reduction of manual operation and attains a more fully unmanned operation.

What is claimed is:

1. An automatic guide method for a vehicle having:
   a driving wheel,
   a magnetic sensor that detects a magnetic field generated by a guide path which is made of magnetic tape and which is placed on a floor along a running course of said vehicle,
   driving means, operatively connected with said driving wheel, for moving said vehicle, and
   a steering means controlled by a control device that processes signals detected by said sensor, for steering said vehicle, comprising the steps of:
      turning said sensor, on commencement of vehicle operation, right and left and searching for the guide path with said vehicle at a standstill;
      turning said vehicle, if the guide path cannot be found, constantly in a first direction while moving said vehicle at a predetermined low speed to search for the guide path for a first predetermined time, and, if the guide path is still not found,
      turning said vehicle while moving at the predetermined low speed, constantly in a second direction opposite to the first direction for a second predetermined time which is essentially twice as long as the first predetermined time;
      accelerating said vehicle, if the guide path is found, along the guide path to a predetermined normal speed in order to resume a normal operation; and
      halting said vehicle if the guide path is not found during the first and second preset times.

2. An automatic guide method for a vehicle having:
   a driving wheel,
   a magnetic sensor that detects a magnetic field generated by a guide path which is made of magnetic tape and which is placed on a floor along a running course of said vehicle,
   driving means operatively connected with said driving wheel for moving said vehicle, and
   steering means controlled by a control device that processes signals detected by said magnetic sensor, comprising the steps of:
      reducing the speed of said vehicle, if said vehicle strays off course and deviates from the guide path during operation, to a predetermined low speed;
      determining a direction in which said vehicle has deviated from the guide path;
      turning said steering means in a direction opposite to the direction of the deviation;
      searching for the guide path for a preset period of time, and if said vehicle is restored to the guide path, accelerating said vehicle to a normal speed in order to resume normal operation; and
      terminating the operation of said vehicle if the guide path cannot be located within said preset time.

3. An automatic guide method for a vehicle which includes:
   a driving and steering unit which has:
      a driving means for driving a driving wheel of said vehicle, and
      a steering means for steering said driving wheel, and
      a trolley having a chassis which has wheels at the four corners thereof,
         said driving means being controlled by a control device that processes signals from a sensor that detects the magnetic field generated by a guide path formed with magnetic tape, said driving and steering unit being attached to the under surface of the chassis, comprising the step of:
            controlling said steering means, at the start of operation, to turn said magnetic sensor right and left in unison with the driving wheel when searching for the guide path.

4. An automatic guide method for a vehicle which includes:
   a chassis forming part of said vehicle,
   two driving wheels, one provided on either side of said chassis,
   a sensor, provided at the front portion of said chassis, for detecting a magnetic field generated by a magnetic guide tape placed on a surface along which said vehicle travels,
   two driving means one provided for each of said driving wheels, said driving means being controlled by control devices that process signals detected by said sensor, and
   steering means that differentially drives said two driving wheels through said driving means that are controlled by said control device, comprising the step of:
      turning said chassis right and left, at the start of operation, by controlling said steering means to turn said magnetic sensors right and left by differentially driving said two driving wheels.

5. A method of automatically guiding a vehicle comprising the steps of:
   using a sensor to detect a predetermined guide which is laid along a running course of the vehicle;
   locating the predetermined guide by:
      moving the sensor back and forth from left to right while the vehicle has no forward motion;
      turning the vehicle, if the guide is not found by moving the sensor back and forth from left to right, constantly in a first direction while moving the vehicle at a predetermined low speed to search for the guide for a first predetermined time, and, if the guide is still not found,
      turning the vehicle, while moving at the predetermined low speed, constantly in a second direction opposite to the first direction for a second predetermined time which is essentially twice as long as the first predetermined time; and
      halting the vehicle if the guide path is not found during the first and second preset times.

6. A method of automatically guiding a vehicle comprising the steps of:
   using a sensor to sense a predetermined guide structure which is laid along a path the vehicle is required to traverse;
   reducing vehicle speed to a predetermined low speed, if the vehicle strays off course and deviates from the predetermined guide structure by an amount wherein the sensor can no longer detect the predetermined guide structure;
   determining a direction in which the vehicle deviated from the guide path;
   turning the vehicle in a direction opposite to the direction of the deviation;
   executing a search for a preset period of time; and
   stopping the vehicle if the guide path cannot be located within the preset time.

7. A method of controlling an automatic vehicle comprising the steps of:

controlling a vehicle by turning the vehicle, left and right while the vehicle is not moving forward, in a manner which moves a sensor, located at the front of the vehicle, left and right in search of a guide which marks a path the vehicle is to follow;

controlling the vehicle, in the event that the guide is not detected by the sensor, to move forward at a predetermined low speed while turning the vehicle constantly to one of left and right for a first predetermined time;

controlling the vehicle, in the event that the guide is still not detected by the sensor, to move forward at a predetermined low speed while turning the vehicle constantly to the other of left and right for a second predetermined time which is approximately twice as long as the first predetermined period of time; and stopping the vehicle in the event that the guide is not detected by the sensor in either of the first and second predetermined periods of time.

8. A method of controlling an automatic vehicle which includes:

a chassis, two driving wheels operatively mounted on said chassis, a sensor disposed at a front portion of the chassis, said sensor detecting a guide provided along a path the vehicle travels, and steering means for differentially driving the two driving wheels, comprising the step of:

turning the chassis, if said sensor does not detect the guide at the start of operation, back and forth from left to right with essentially no forward motion of the vehicle, by controlling the steering means to differentially drive the two driving wheels in a manner which sweeps the magnetic sensor right and left in search of the guide.

9. A method as set forth in claim 8, further comprising the steps of:

moving the vehicle forward at a predetermined low speed if the guide has not been detected by said sensor during the turning of the chassis left and right with no forward motion;

turning the vehicle continuously in one the left and right directions for a predetermined period of time, and, if the said sensor does not detect the guide within the predetermined time, turning the vehicle continuously to the other of the left and right for a second predetermined time which is longer than the first predetermined period of time; and stopping the vehicle if the guide is not found during the second predetermined period of time.

* * * * *